(12) United States Patent
Yu

(10) Patent No.: US 10,417,768 B2
(45) Date of Patent: Sep. 17, 2019

(54) SYSTEMS AND METHODS FOR AUTOMATIC VERTEBRAE SEGMENTATION AND IDENTIFICATION IN MEDICAL IMAGES

(71) Applicant: SHENZHEN UNITED IMAGING HEALTHCARE CO., LTD., Shenzhen, Guangdong (CN)

(72) Inventor: Wenjun Yu, Shanghai (CN)

(73) Assignee: SHENZHEN UNITED IMAGING HEALTHCARE CO., LTD, Shenzhen (CN)

( * ) Notice: Subject to any disclaimer, the term of this patent is extended or adjusted under 35 U.S.C. 154(b) by 0 days.

(21) Appl. No.: 15/828,786

(22) Filed: Dec. 1, 2017

(65) Prior Publication Data
US 2019/0035085 A1   Jan. 31, 2019

Related U.S. Application Data

(63) Continuation of application No. PCT/CN2017/095299, filed on Jul. 31, 2017.

(51) Int. Cl.
*G06T 7/12* (2017.01)
*G06K 9/34* (2006.01)
*G06T 7/33* (2017.01)

(52) U.S. Cl.
CPC .............. *G06T 7/12* (2017.01); *G06K 9/34* (2013.01); *G06T 7/344* (2017.01); *G06T 2207/10081* (2013.01); *G06T 2207/30012* (2013.01)

(58) Field of Classification Search
CPC ......... A47C 21/048; A47C 7/425; A47C 7/46; A47D 15/00; B60N 2/5685; B60N 2/663; B60N 2/665; B60N 2/976; A61F 2/442; A61F 2002/2821; A61F 2310/00353; A61F 2002/2817; A61F 2002/4627;
(Continued)

(56) References Cited

U.S. PATENT DOCUMENTS 3,420,229 A * 1/1969 Miller .................. A61H 1/0222
606/243
4,570,640 A * 2/1986 Barsa .................. A61B 5/1106
600/554
(Continued)

FOREIGN PATENT DOCUMENTS

CN        102018525 A      4/2011

OTHER PUBLICATIONS

Ruigiong Shi, Research on the MRI Spine Image disk positioning and vertebral segmentation algorithm: Master's thesis, Beijing Jiaotong University, Beijing, China, 2007.
(Continued)

*Primary Examiner* — Aklilu K Woldemariam
(74) *Attorney, Agent, or Firm* — Metis IP LLC

(57) ABSTRACT

The present disclosure relates to a method, system and non-transitory computer readable medium. In some embodiments, the method includes: acquiring a plurality of image slices related to a vertebral column, the vertebral column including a plurality of vertebrae; obtaining a classifier for verterbrae identification; identifying, by a processor, one or more vertebral foramina in the plurality of image slices using the classifier; and determining, by the processor, the plurality of vertebrae based on the one or more vertebral foramina.

16 Claims, 15 Drawing Sheets

(58) Field of Classification Search
CPC ............... A61F 2/4455; A61B 17/1671; A61B
17/1757; A61B 17/3472; A61B 5/055;
A61B 5/4566; A61B 5/7267; A61B
6/463; A61B 6/505; A61B 6/5217; A61B
2017/564; A61B 17/1703; A61B 2505/05;
A61B 2562/043; A61B 5/1106; A61B
5/4035; A61B 5/4041; A61B 5/4047;
A61B 5/411; A61B 5/4519; A61B
5/4821; A61B 5/6823; Y10S 606/909;
G06T 2207/30012; G06T 7/0012; G06T
2207/10016; G06T 2207/10072; G06T
2207/10088; G06T 2207/20081; G06T
2207/30101; G06T 7/11; G06T 7/136;
G06T 7/143; G06T 7/62; G06K 2209/05;
G06K 9/3233; G06K 9/4604; G06K
9/6269; G06K 9/34; A61N 5/1027; A61N
1/36021; A61M 3/0283; G06F 19/00;
G06F 19/321
USPC .......... 382/131; 600/407, 554; 606/279, 500,
606/46, 41, 246, 247, 48, 50
See application file for complete search history.

(56) References Cited

U.S. PATENT DOCUMENTS

| | | | | |
|---|---|---|---|---|
| 7,014,633 | B2* | 3/2006 | Cragg | A61B 17/1671 128/898 |
| 9,033,416 | B1* | 5/2015 | Vanderhorst | A47C 7/46 297/284.5 |
| 2001/0049527 | A1* | 12/2001 | Cragg | A61B 17/1671 606/279 |
| 2002/0016583 | A1* | 2/2002 | Cragg | A61B 17/1671 604/500 |
| 2002/0173796 | A1* | 11/2002 | Cragg | A61B 17/1671 606/86 R |
| 2003/0014047 | A1* | 1/2003 | Woloszko | A61B 18/148 606/41 |
| 2003/0014051 | A1* | 1/2003 | Woloszko | A61B 18/1477 606/46 |
| 2005/0261695 | A1* | 11/2005 | Cragg | A61B 17/1671 606/86 R |
| 2007/0233260 | A1* | 10/2007 | Cragg | A61B 17/1671 623/17.12 |
| 2009/0018584 | A1* | 1/2009 | Henderson, Sr. | A61B 17/7047 606/246 |
| 2010/0152808 | A1* | 6/2010 | Boggs, II | A61N 1/0456 607/46 |
| 2013/0253605 | A1* | 9/2013 | Bennett | A61N 1/36071 607/46 |
| 2014/0323845 | A1 | 10/2014 | Forsberg | |
| 2015/0248593 | A1* | 9/2015 | Nakashima | A61B 6/505 382/131 |
| 2015/0356729 | A1 | 12/2015 | Hladuvka et al. | |
| 2016/0210742 | A1 | 7/2016 | Weiss | |
| 2017/0148185 | A1* | 5/2017 | Wu | G06K 9/3233 |
| 2018/0296792 | A1* | 10/2018 | Hochman | A61M 5/20 |

OTHER PUBLICATIONS

Jeannette L. Herring et al., Automatic Lumbar Vertebral Identification Using Surface-Based Registration, Journal of Biomedical Informatics 34,74-84 (2001).

Jun Ma et al., Hierarchical Segmentation and Identification of Thoracic Vertebra Using Learning-Based Edge Detection and Coarse-to-Fine Deformable Model, CAD & Knowledge Solutions, Siemens Healthcare, Malvern, PA 19355 Center for Imaging Science, Johns Hopkins University, Baltimore, MD 21218, 9 pages ,2010.

Stacy D O'Connor et al., Automated Spinal Column Extraction and Partitioning, Diagnostic Radiology Department, National Institutes of Health, 4 pages, 2006.

* cited by examiner

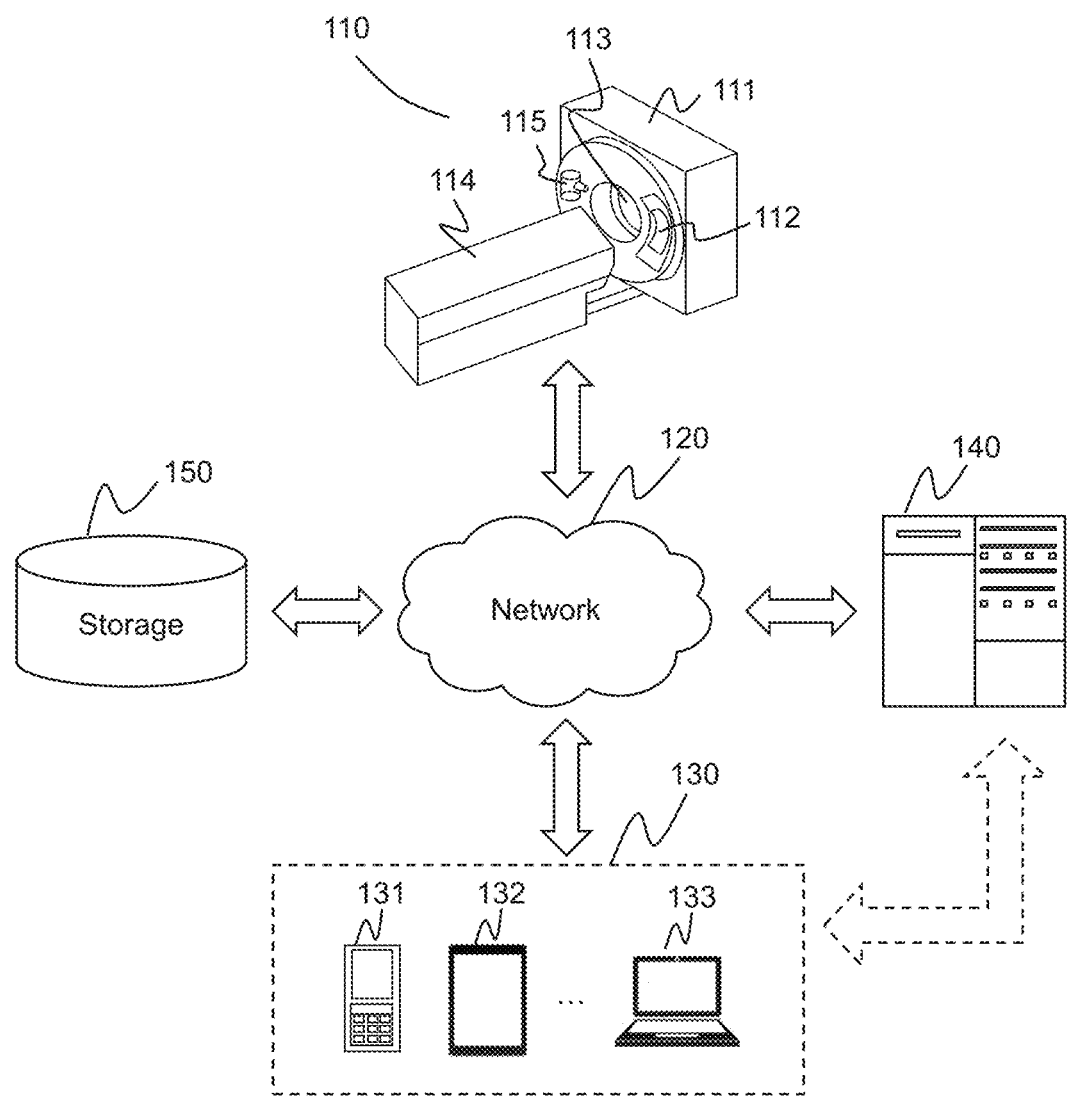
FIG. 1-A

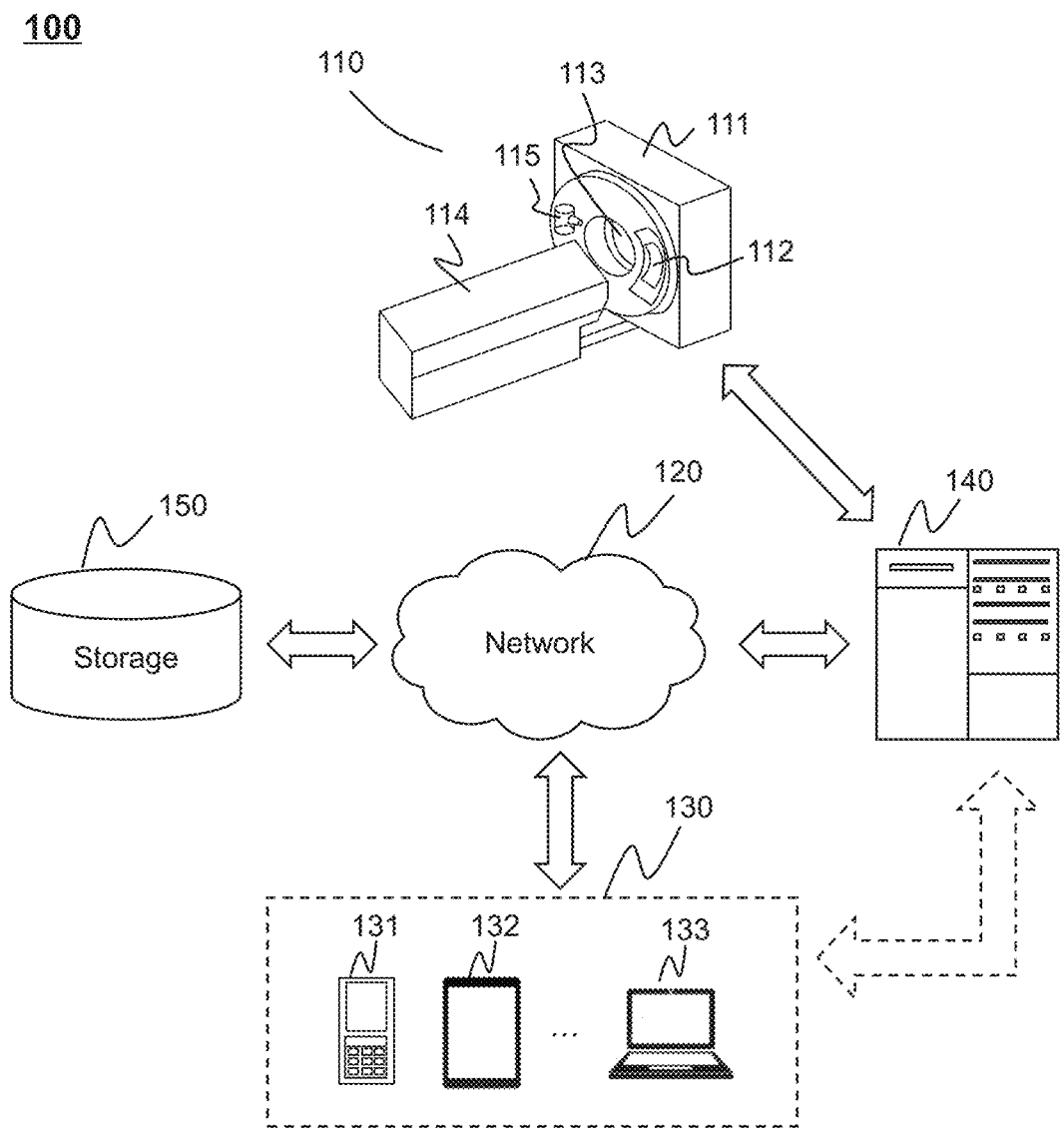
FIG. 1-B

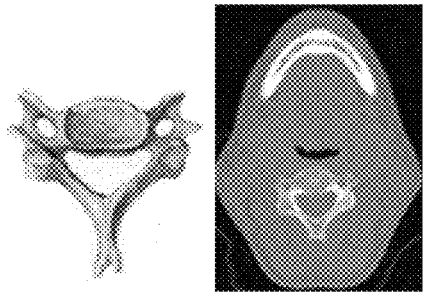
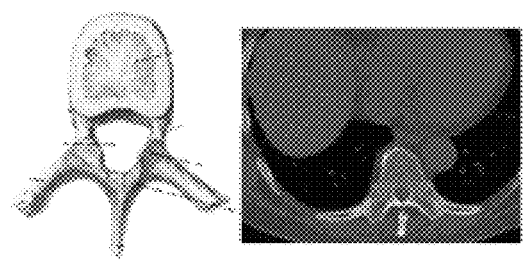
FIG. 16-A　　　　　　　FIG. 16-B
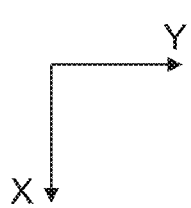
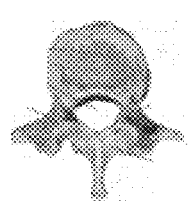
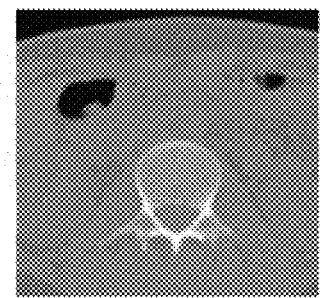
FIG. 16-C

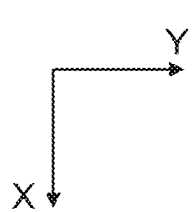
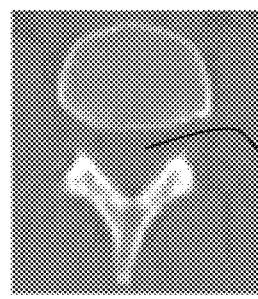
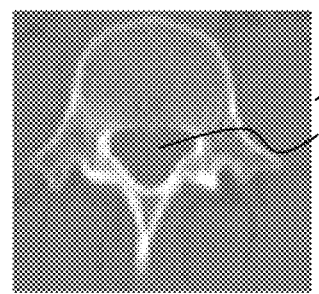
FIG. 17-A       FIG. 17-B
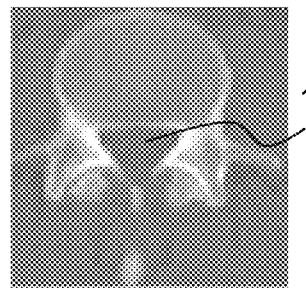
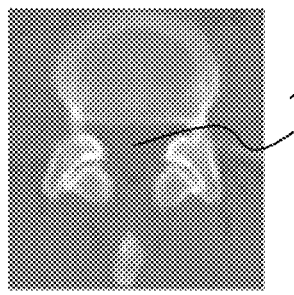
FIG. 17-C       FIG. 17-D
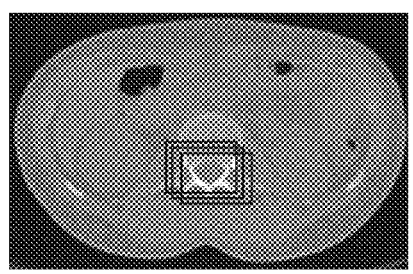
FIG. 17-E

SYSTEMS AND METHODS FOR AUTOMATIC VERTEBRAE SEGMENTATION AND IDENTIFICATION IN MEDICAL IMAGES

CROSS-REFERENCE TO RELATED APPLICATIONS

This present application is a continuation of International Application No. PCT/CN2017/095299, filed on Jul. 31, 2017, the contents of which are hereby incorporated by reference.

TECHNICAL FIELD

The present disclosure generally relates to image processing, and more particularly relates to methods and systems for processing image data for vertebrae identification.

BACKGROUND

Identification and analysis of vertebrae in a vertebrae column based on medical images is important and necessary for many medical applications. However, due to the similarities among the vertebrae and the complexity of the vertebrae, it is difficult and time-consuming to identify each of the vertebrae by a doctor or using conventional image processing techniques. Accordingly, it is desirable to provide systems and methods for automatic segmentation and identification of vertebrae in medical images.

SUMMARY

According to an aspect of the present disclosure, a method for image processing is provided. The method may include one or more of the following operations: acquiring a plurality of image slices related to a vertebral column, the vertebral column including a plurality of vertebrae; obtaining a classifier for verterbrae identification; identifying, by a processor, one or more vertebral foramina in the plurality of image slices using the classifier; and determining, by the processor, the plurality of vertebrae based on the one or more vertebral foramina.

In some embodiments, identifying the one or more vertebral foramina in the plurality of image slices further comprises: detecting a plurality of sections in the plurality of image slices; and identifying the one or more vertebral foramina based on the plurality of sections.

In some embodiments, at least one of the plurality of image slices includes more than one of the plurality of sections, each of the more than one of the plurality of sections having a vertebral foramen.

In some embodiments, determining the plurality of vertebrae further comprises determining a weighted average of the more than one of the plurality of sections.

In some embodiments, obtaining the classifier for vertebrae identification further comprises: generating one or more features of the classifier, acquiring a plurality of samples related to the one or more vertebral foramina; and training the classifier based on the one or more features and the plurality of samples. The plurality of samples includes at least one of a positive sample or a negative sample.

In some embodiments, determining the plurality of vertebrae further comprises: dividing the one or more vertebral foramina into one or more groups; and determining the plurality of vertebrae based on the one or more groups.

In some embodiments, the at least one processor is further directed to tagging the plurality of vertebrae.

In some embodiments, determining the plurality of vertebrae further comprises: determining at least one reference point based on the plurality of image slices; and determining the plurality of vertebrae based on a distance between the reference point and the identified one or more vertebral foramina.

In some embodiments, the at least one processor is further directed to reconstructing a sagittal plane image of the vertebral column based on the plurality of vertebrae.

In some embodiments, reconstructing the sagittal plane image further comprises: segmenting image data corresponding to a spinal cord based on the plurality of vertebrae; determining a boundary of the spinal cord; and reconstructing a sagittal plane image within the boundary. The boundary ranges from a first coordinate to a second coordinate along an axis.

According to an aspect of the present disclosure, a system may include at least one computer-readable storage medium including a set of instructions and at least one processor in communication with the at least one computer-readable storage medium. When executing the instructions, the at least one processor is directed to: acquire a plurality of image slices related to a vertebral column, the vertebral column including a plurality of vertebrae; obtain a classifier for verterbrae identification; identify one or more vertebral foramina in the plurality of image slices using the classifier; and determine the plurality of vertebrae based on the one or more vertebral foramina.

According to an aspect of the present disclosure, a non-transitory computer readable medium may include instructions configured to cause a computing system to: acquire a plurality of image slices related to a vertebral column, the vertebral column including a plurality of vertebrae; obtain a classifier for verterbrae identification; identify one or more vertebral foramina in the plurality of image slices using the classifier; and determine the plurality of vertebrae based on the one or more vertebral foramina.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 1-A and 1-B are schematic diagrams illustrating an exemplary CT system according to some embodiments of the present disclosure;

FIGS. 16-A to 16-C illustrate exemplary transverse plane images of a cervical vertebra, a thoracic vertebra and a lumbar vertebra according to some embodiments of the present disclosure;

FIGS. 17-A to 17-E illustrate exemplary transverse plane images of a vertebral foramen according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
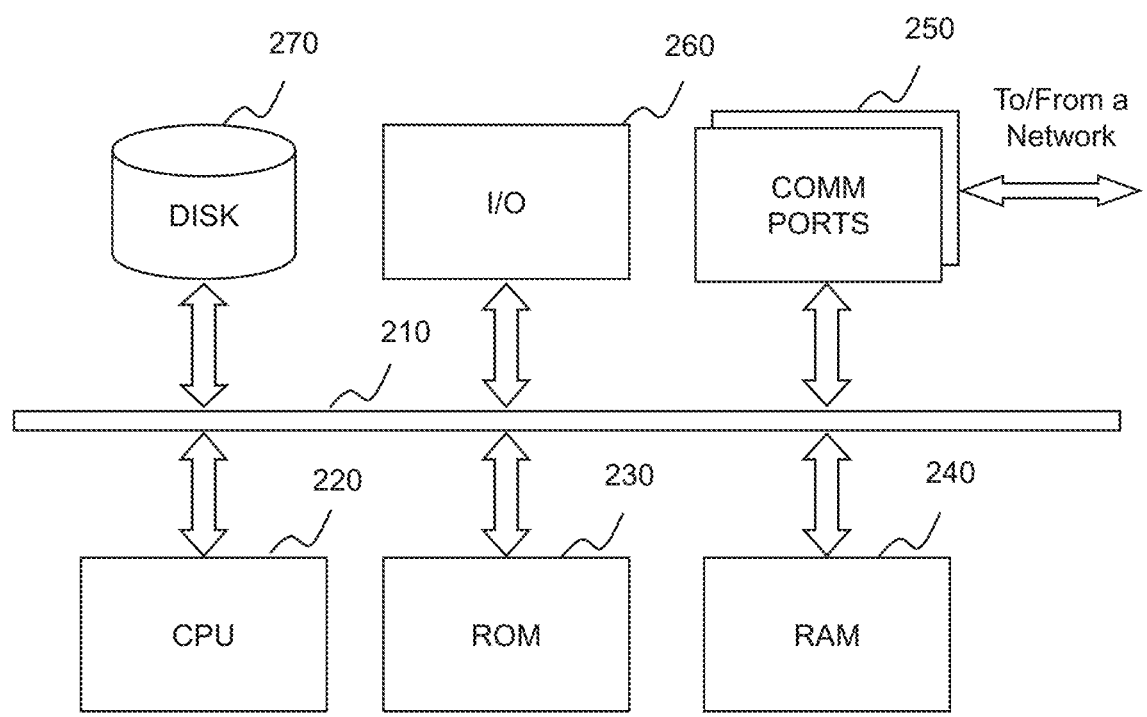
FIG. 2 is a schematic diagram illustrating an exemplary computing device on which the CT system can be implemented, according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for identifying vertebra and/or reconstructing a sagittal plane image thereof. In some embodiments, the imaging system may be a computed tomography (CT) system, an emission computed tomography (ECT) system, a magnetic resonance imaging (MRI) system, an ultrasonography system, a positron emission tomography (PET) system, or the like, or any combination thereof.

The following description is provided to help better understanding CT image reconstruction methods and/or systems. The term "image" used in this disclosure may refer to a 2D image, a 3D image, a 4D image, and/or any related image data (e.g., CT data, projection data corresponding to the CT data). This is not intended to limit the scope the present disclosure. For persons having ordinary skills in the art, processes and/or applications in the CT image reconstruction may also be applicable in other modal imaging systems described above.

It should be noted that, for the purposes of brevity, a section of an image slice, an image slice, and/or a volume image corresponding to an organ and/or a tissue may be described as the organ and/or the tissue. For example, "identifying a section corresponding to a vertebral foramen in an image slice" may be described as "identifying a vertebral foramen". As another example, "determine one or more image slices corresponding to a vertebra" may be described as "determine a vertebra". The organ and/or tissue may include a cranii, a liver, a vertebra, a vertebral foramen, a spinal cord, etc.

Moreover, the system and method in the present disclosure are described primarily in regard to identifying a plurality of vertebrae in a plurality of image slices In some embodiments, the system and the method may identify a plurality of vertebral foramina in the plurality of image slices. The system and the method may further identify the plurality of vertebrae based on the plurality of vertebral foramina FIGS. 1-A and 1-B are schematic diagrams illustrating an exemplary CT system 100 according to some embodiments of the present disclosure. As shown, the CT system 100 may include a CT scanner 110, a network 120, one or more terminals 130, a processing engine 140, and a storage 150.

The CT scanner 110 may include a gantry 111, a detector 112, a detecting region 113, a table 114, and a radioactive scanning source 115. The gantry 111 may support the detector 112 and the radioactive scanning source 115. A subject may be placed on the table 114 for scanning. The radioactive scanning source 115 may emit radioactive rays to the subject. The detector 112 may detect radiation events (e.g., gamma photons) emitted from the detecting region 113. In some embodiments, the detector 112 may include one or more detector units. The detector units may include a scintillation detector (e.g., a cesium iodide detector), a gas detector, etc. The detector unit may be and/or include a single-row detector and/or a multi-rows detector.

The network 120 may include any suitable network that can facilitate exchange of information and/or data for the CT system 100. In some embodiments, one or more components of the CT system 100 (e.g., the CT scanner 110, the terminal 130, the processing engine 140, the storage 150, etc.) may communicate information and/or data with one or more other components of the CT system 100 via the network 120. For example, the processing engine 140 may obtain image data from the CT scanner 110 via the network 120. As another example, the processing engine 140 may obtain user instructions from the terminal 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the CT system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process CT data (e.g., a plurality of image slices) obtained from the CT scanner 110, the terminal 130, and/or the storage 150. For example, the processing engine 140 may identifying a plurality of vertebrae in the plurality of image slices. In some embodiments, the processing engine 140 may be a single server or a server group. The server group may be centralized or distributed. In some embodiments, the processing engine 140 may be local or remote from other components in the CT system 100. The processing engine 140 may access CT data stored in the CT scanner 110, the terminal 130, and/or the storage 150 via the network 120. Alternatively, the processing engine 140 may be directly connected to the CT scanner 110, the terminal 130 and/or the storage 150 to access stored CT data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The storage 150 may store data, instructions, and/or any other information. In some embodiments, the storage 150 may store data obtained from the terminal 130 and/or the processing engine 140. In some embodiments, the storage 150 may store data and/or instructions that the processing engine 140 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more other components in the CT system 100 (e.g., the processing engine 140, the terminal 130, etc.). One or more components in the CT system 100 may access the data or instructions stored in the storage 150 via the network 120. In some embodiments, the storage 150 may be directly connected to or communicate with one or more other components in the CT system 100 (e.g., the processing engine 140, the terminal 130, etc.). In some embodiments, the storage 150 may be part of the processing engine 140.

FIG. 2 is a schematic diagram illustrating an exemplary computing device 200 on which the CT system 100 can be implemented, according to some embodiments of the present disclosure.

The computing device 200 may be a general purpose computer or a special purpose computer. Both may be used to implement a CT system of the present disclosure. The computing device 200 may be used to implement any component of the service as described herein. For example, the processing engine 140 of the CT system may be implemented on the computing device 200, via its hardware, software program, firmware, or a combination thereof. Although only one such computer is shown for convenience, the computer functions related to the CT system as described herein may be implemented in a distributed manner on a number of similar platforms to distribute the processing load.

The computing device 200, for example, may include COM ports 250 connected to and from a network (e.g., the network 120) connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 executes both step A and step B. As in another example, step A and step B may also be performed by two different CPUs and/or processors jointly or separately in the computing device 200 (e.g., the first processor executes step A and the second processor executes step B, or the first and second processors jointly execute steps A and B).

Figure 3:
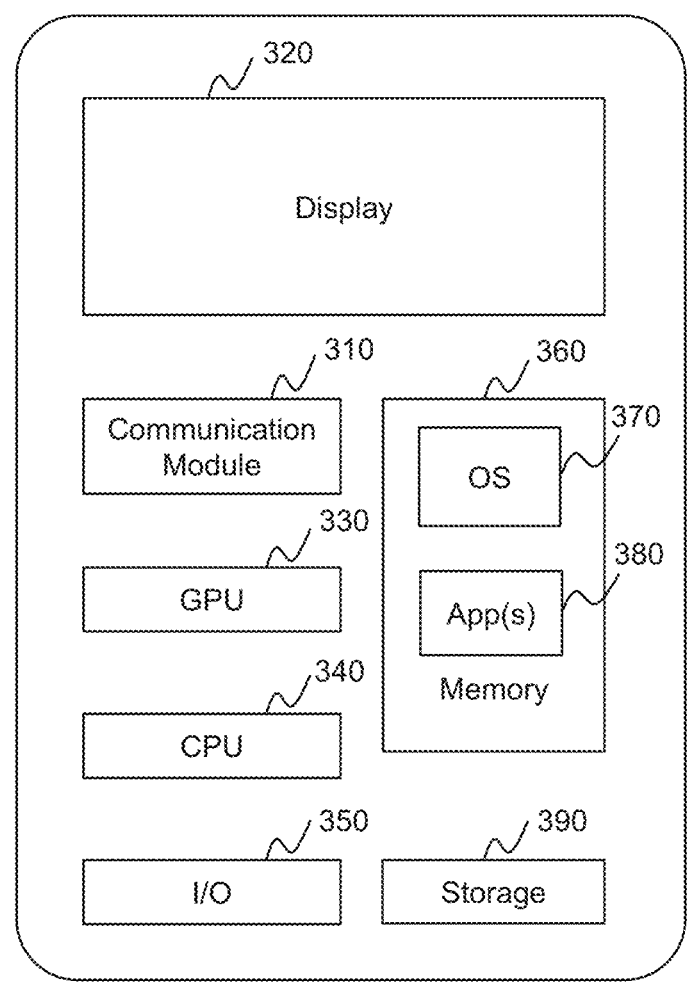
FIG. 3 is a schematic diagram illustrating exemplary hardware and/or software components of an exemplary mobile device on which the terminal may be implemented according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the CT system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
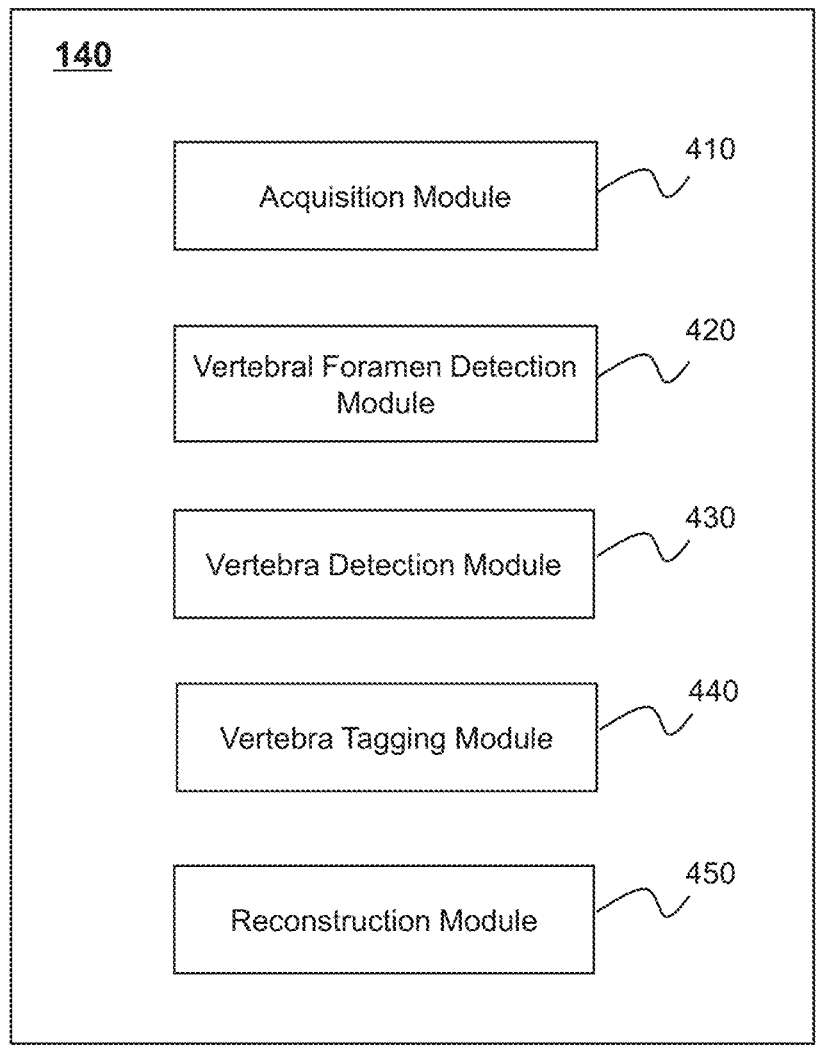
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 140 may include an acquisition module 410, a vertebra foramen detection module 420, a vertebra detection module 430, a vertebra tagging module 440 and a reconstruction module 450. The processing engine 140 may be implemented on various components (e.g., the processor 210 of the computing device 200 as illustrated in FIG. 2). More or less components may be included in the processing engine 140 without loss of generality. For example, two of the modules may be combined into a single module, or one of the modules may be divided into two or more modules. In one implementation, one or more of the modules may reside on a same or different computing devices (e.g., different server computers).

The acquisition module 410 may acquire CT data related to a region of interest, for example, a vertebral column. The vertebral column may include a plurality of vertebrae. Each of the plurality of vertebrae may include a vertebral foramen, a vertebral body, a vertebral arch, etc. The plurality of vertebrae may be classified into one or more types. The one or more types may include cervical vertebrae (including seven vertebrae), thoracic vertebrae (including twelve vertebrae), lumbar vertebrae (including five vertebrae), sacral vertebrae (including five vertebrae), and coccygeal vertebrae (including three or four vertebrae). In some embodiments, the CT data may be in the manner of Digital Imaging and Communication in Medicine (DICOM). In some embodiments, the CT data may include three dimensional (3D) images, two dimensional (2D) images, etc. The 3D images may include a stack of 2D images (e.g., a stack of image slices). For example, the CT data may include a plurality of image slices in the transverse plane (also referred to herein "transverse plane image"). The transverse plane is an anatomical plane that divides a body into superior and inferior parts. In some embodiments, the plurality of image slices may be marked in an organized manner (e.g., sequentially numbered based on the position of organs/tissues presented in the image slices). For example, the plurality of image slices may be numbered sequentially as $1^{st}, 2^{nd}, \ldots, n^{th}$ in the slice direction (also referred to "Z axis"). The slice direction may refer to the head to feet direction or the feet to head direction. The $1^{st}, 2^{nd}, \ldots, n^{th}$ may refer to slice identifiers of the plurality of image slices. For the purposes of brevity, a slice with a slice identifier $n^{th}$ may be describes the $n^{th}$ image slice.

The vertebra foramen detection module 420 may identify one or more vertebral foramina. The vertebra foramen detection module 420 may identify the one or more vertebral foramina in a plurality of image slices. In some embodiments, the vertebra foramen detection module 420 may identify the one or more vertebral foramina by a classifier. The classifier may identify a section in which the one or more vertebral foramina may locate.

The vertebra detection module 430 may determine a plurality of vertebrae. In some embodiments, each of the plurality of vertebrae may be included in one or more image slices. In some embodiments, the vertebra detection module 430 may determine the plurality of vertebrae based on one or more vertebral foramina (e.g., identified by the vertebral foramen detection module 420) and at least one reference point. The plurality of vertebrae may be identified based on a relative position of the plurality of vertebrae and a position of the at least one reference point. Alternatively or additionally, the vertebra detection module 430 may determine the plurality of vertebrae based on a quantity of the plurality of vertebrae.

The vertebra tagging module 440 may tag a plurality of vertebrae. The vertebra tagging module 440 may determine a plurality of serial numbers of the plurality of vertebrae. For the purposes of illustration, each vertebra in a type of vertebrae may be assigned to a serial number. The serial number may refer to a rank of position in the type of vertebrae. For example, the serial number of the first vertebra in the cervical vertebrae may be $1^{st}$. The vertebra tagging module 440 may further tag the plurality of vertebrae based on the plurality of serial numbers.

The reconstruction module 450 may reconstruct an image. The image may include a sagittal plane image, a transverse plane image, a coronal plane image, or a combination thereof. The sagittal plane is an anatomical plane that divides a body into left and right parts. The coronal plane is an anatomical plane that divides a body into front and back parts. In some embodiments, the reconstruction module 450 may reconstruct a sagittal plane image of a plurality of vertebrae. Additionally, the reconstruction module 450 may reconstruct the sagittal plane image based on a spinal cord in a plurality of vertebral foramina.

In some embodiments, one or more modules illustrated in FIG. 4 may be implemented in at least part of the exemplary CT system as illustrated in FIGS. 1-A and 1-B. For example, the acquisition module 410, the vertebra foramen detection module 420, the vertebra detection module 430, the vertebra tagging module 440 and/or the reconstruction module 450 may be integrated into a console (not shown). Via the console, a user may set parameters for scanning an object, controlling imaging processes, controlling parameters for reconstruction of an image, viewing reconstructed images, etc. In some embodiments, the console may be implemented via the processing engine 140 and/or the terminal 130.

Figure 5:
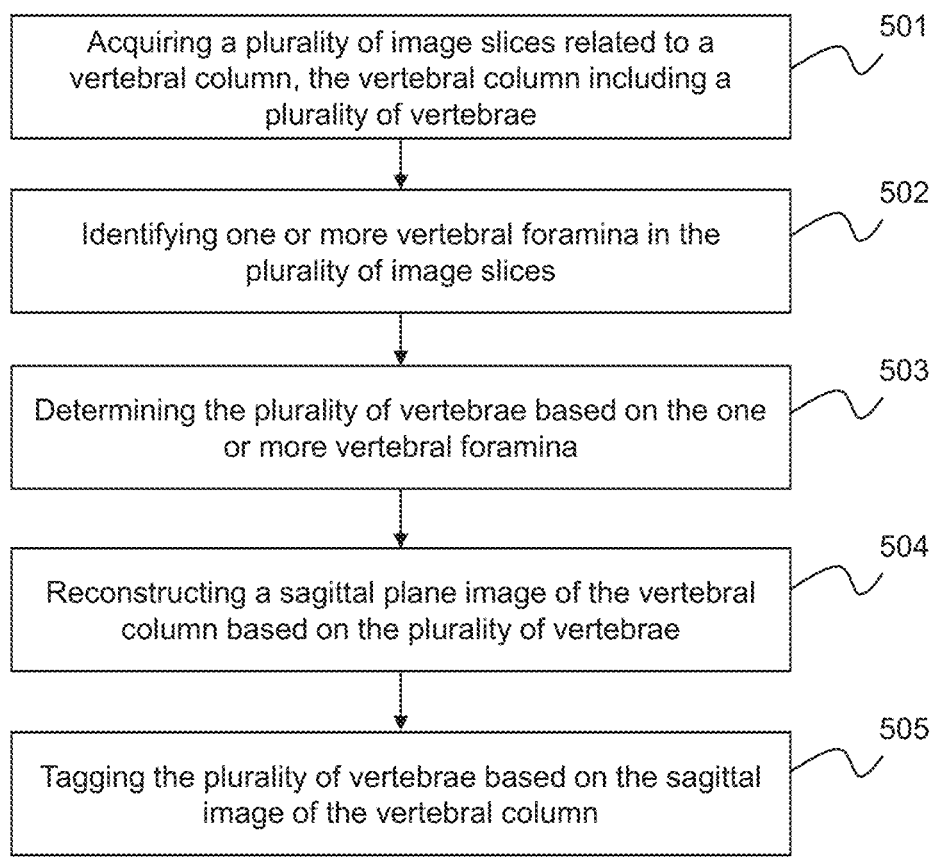
FIG. 5 is a flowchart illustrating an exemplary process for reconstructing a sagittal plane image according to some embodiments of the present disclosure.

FIG. 5 is a flowchart illustrating an exemplary process 500 for reconstructing a sagittal plane image according to some embodiments of the present disclosure. Process 500 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 500 may be performed by or be implemented on the processing engine 140 of the CT system 100.

In 501, a plurality of image slices related to a vertebral column may be acquired. The acquisition of the plurality of image slices may be performed by the acquisition module 410. The vertebral column may include a plurality of vertebrae. For example, the vertebral column may include a whole vertebral column of a human body or a segmentation thereof (e.g., cervical vertebrae, thoracic vertebrae, lumbar vertebrae, etc.). In some embodiments, each of the image slices may be a transverse plane image. In some embodiments, each of the plurality of image slices may be associated with a slice identifier. The slice identifier may include one or more numbers, characters, symbols, etc. that can be used to identify the image slice. For example, the slice identifier of the first image slice of the plurality of image slices may be "1."

In 502, one or more vertebral foramina in the plurality of image slices may be identified. The identification of the one or more vertebral foramina may be performed by the vertebral foramen detection module 420. In some embodiments, one or more vertebral foramina with a characteristic boundary may be identified. The characteristic boundary of a vertebral foramen may include a boundary that can be recognized by a program. The characteristic boundary may include a complete or substantially complete boundary of a vertebral foramen. As used herein, substantially complete boundary may refer to a boundary having a significant amount of similarity with the complete boundary. In some embodiments, the substantially complete boundary may have no lower than 60%, or 70% m, or 80%, or 90%, or 95% of similarity with the complete boundary. In some embodiments, one or more of the vertebral foramina may be identified using a classifier. For example, in the plurality of image slices, the classifier may determine one or more sections having the one or more vertebral foramina. In some embodiments, the section may include a rectangular shape, a circular shape, or any other suitable shape.

In 503, the plurality of vertebrae may be determined based on the one or more vertebral foramina. The determination of the plurality of vertebrae may be performed by the vertebra detection module 430. In some embodiments, the vertebra detection module 430 may divide the one or more vertebral foramina into one or more groups. The vertebra detection module 430 may determine the plurality of vertebrae based on the groups. In some embodiments, the vertebra detection module 430 may determine the plurality of vertebrae based on a threshold. The threshold may be a theoretical quantity of vertebrae. For example, the vertebra detection module 430 may compare the quantity of the determined vertebrae with the threshold. In response to the determination that the quantity of the determined vertebrae is less than the threshold, the vertebra detection module 430 may continue the process of determining the vertebrae.

Figure 18:
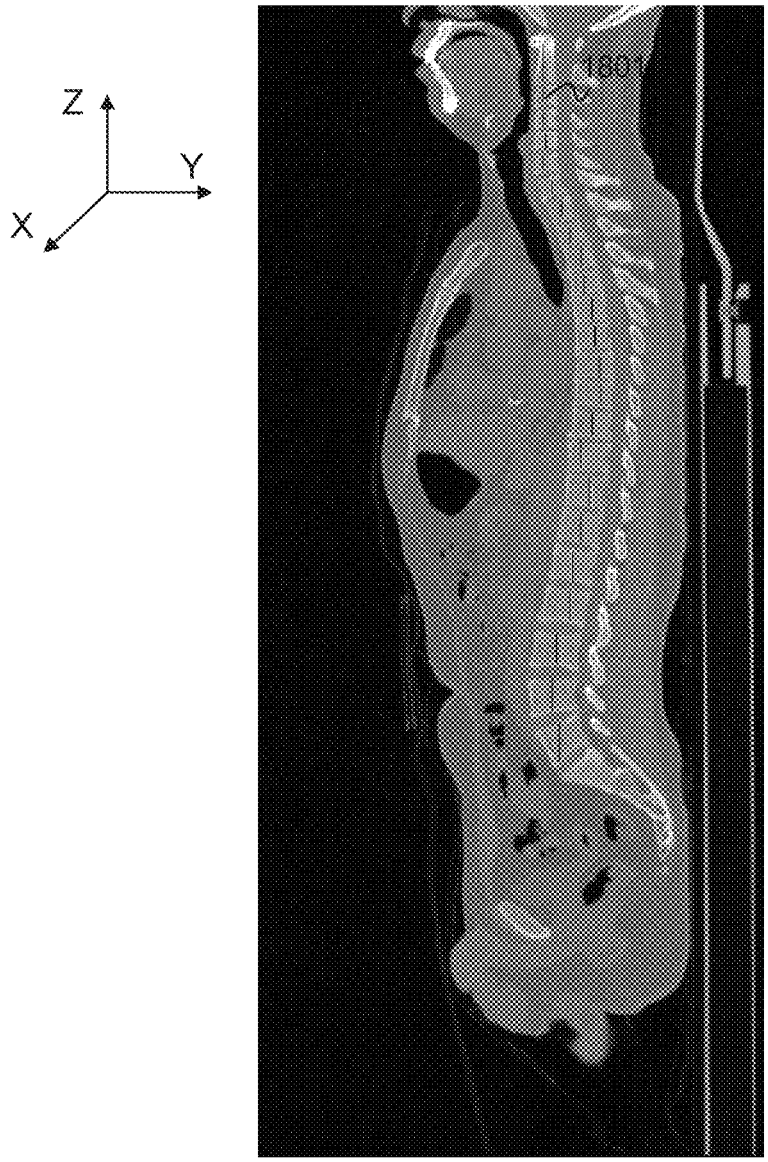
FIG. 18 illustrates an exemplary sagittal plane image of a vertebral column according to some embodiments of the present disclosure.

In 504, a sagittal plane image of the vertebral column may be reconstructed based on the plurality of vertebrae. The reconstruction of the sagittal plane image may be performed by the reconstruction module 450. In some embodiments, the sagittal plane image may be reconstructed based on a spinal cord corresponding to the plurality of vertebrae. For example, the sagittal plane may locate at a boundary of the spinal cord. The boundary of the spinal cord may be represented by X coordinates in the sagittal plane, where the X axis may point from the right part towards the left part of a patient, as shown in FIG. 18.

In 505, the plurality of vertebrae may be tagged based on the sagittal plane image. The tagging of the plurality of vertebrae may be performed by the vertebra tagging module 440. Before tagging, the plurality of vertebrae may be segmented based on the sagittal plane image of the vertebral column. Then, the location of each of the plurality of vertebrae may be determined. The vertebrae may be tagged based on the location of each of the vertebrae. As described elsewhere in the disclosure, the location of each of the plurality of vertebrae may correspond to a range of slice identifiers, such as "from slice identifier 1 to slice identifier 4." In some embodiments, the tag may take form of "serial number+type of vertebrae". For example, one vertebra may be described as $1^{st}$ cervical vertebra, $1^{st}$ thoracic vertebrae, etc. For the purposes of brevity, the tags of cervical vertebrae may be marked as C1, C2, . . . , C7. The tags of thoracic vertebrae may be marked as T1, T2, . . . , T12. The tags of lumbar vertebrae may be marked as L1, L2, . . . , L5. The tags of sacral vertebrae may be marked as S1, S2, . . . , S5. The tags of coccygeal vertebrae may be marked as Co1, Co2, . . . , Co4.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operation 504 may be unnecessary and may be omitted. The tagging of the plurality of vertebrae may be performed directly based on operation 503. As another example, operation 505 may be performed prior to operation 504.

Figure 6:
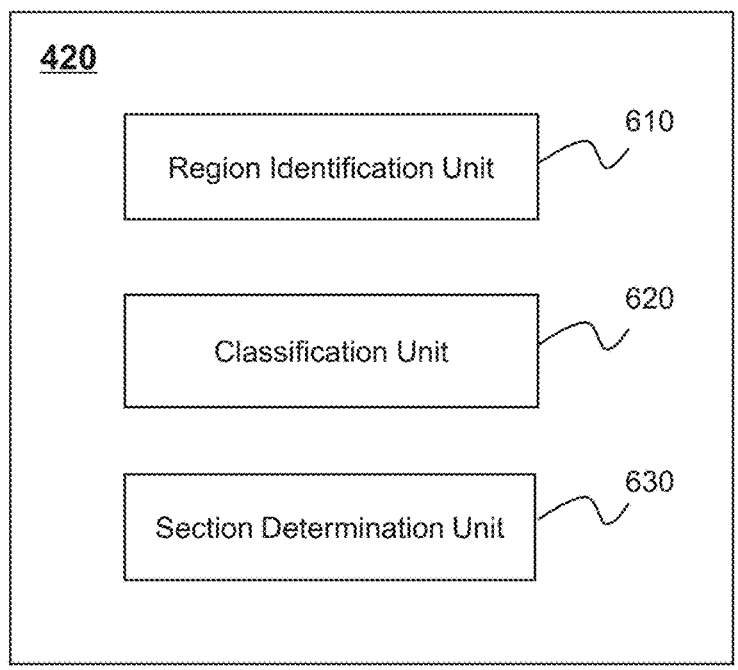
FIG. 6 is a block diagram illustrating an exemplary vertebral foramen detection module according to some embodiments of the present disclosure.

FIG. 6 is a block diagram illustrating an exemplary vertebral foramen detection module 420 according to some embodiments of the present disclosure. The vertebral foramen detection module 420 may include a region identification unit 610, a classification unit 620, and a section determination unit 630. More or less components may be included in the processing engine without loss of generality. For example, two of the modules may be combined into a single module, or one of the modules may be divided into two or more modules. One or more of the modules may reside on a same or different computing devices (e.g., different server computers).

The region identification unit 610 may identify a target region corresponding to an image slice. The target region may be a region of a patient to which the image slice corresponds. In some embodiments, the target region may include a neck, a chest, a waist, or the like, or a combination thereof. In some embodiments, the region identification unit 610 may identify a target region based on an anatomical position of an organ (e.g., a basis cranii, a lung, a liver) in the image slice. The region identification unit 610 may further identify the type of a vertebra in the image slice based on the target region. For example, in response to determining the target region corresponding to the image slice is neck, the region identification unit 610 may identify the vertebra in one or more images as cervical vertebrae.

The classification unit 620 may identify a vertebra foramen in an image slice. The classification unit 620 may identify one or more sections in the image slice. Each of the one or more sections may refer to a regular or irregular section including a vertebral foramen in the image slice. The one or more sections may include a rectangular shape, a circular shape, or any suitable shape. In some embodiments, the classification unit 620 may include one or more classifiers. For example, the classification unit 620 may include different classifiers for identifying different types of vertebrae, such as a classifier for identifying cervical vertebrae, a classifier for identifying thoracic vertebrae, a classifier for identifying lumbar vertebrae, etc. The classifiers may be selected based on a target region (e.g., a target region identified by the region identification unit 610). For example, in response to determining that the target region is a chest, a classifier for identifying thoracic vertebrae may be used. Alternatively, the classification unit 620 may identify different types of vertebrae by a same classifier.

The section determination unit 630 may determine a target section in an image slice. The section determination unit 630 may determine the target section based on a plurality of sections (e.g., a plurality of sections identified by the classification unit 620). In some embodiments, the section determination unit 630 may select one of the plurality of sections as the target section. For example, the section determination unit 630 may select the target section randomly from the plurality of sections. As another example, the section determination unit 630 may rank the plurality of sections and select the target section based on the ranking. The sections may be ranked based on coordinates of the plurality of sections. The coordinates of a section may include the coordinates of pixels in the section. In some embodiments, the section determination unit 630 may determine the target section by determining a weighted average of the plurality of sections. In some embodiments, the section determination unit 630 may determine an overlapping section or a collective section of the plurality of sections as the target section. In some embodiments, the section determination unit 630 may further identify a vertebral foramen based on the target section.

Figure 7:
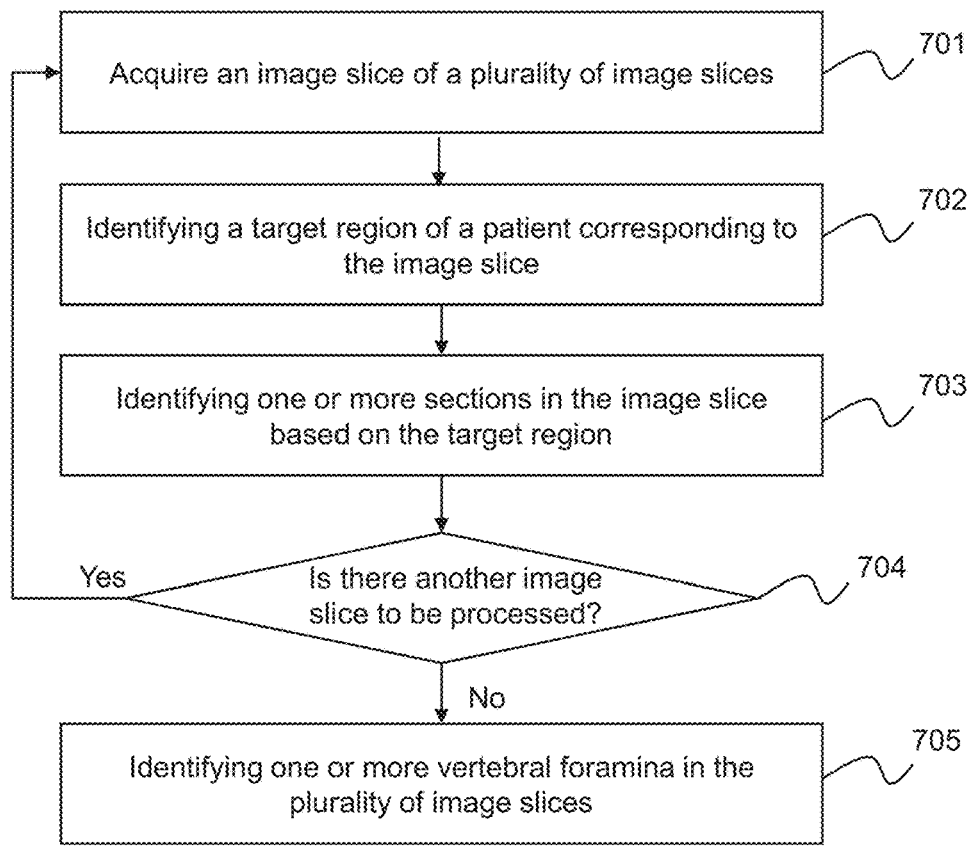
FIG. 7 is a flowchart illustrating an exemplary process for identifying one or more vertebral foramina according to some embodiments of the present disclosure.

FIG. 7 is a flowchart illustrating an exemplary process 700 for identifying one or more vertebral foramina according to some embodiments of the present disclosure. Process 700 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 700 may be performed in connection with 502 as described in FIG. 5. Process 700 may be performed by the vertebral foramen detection module 420.

In 701, an image slice of a plurality of image slices may be acquired. The acquisition of the image slice may be performed by the acquisition module 410. The plurality of image slices may relate to a vertebral column.

In 702, a target region of a patient corresponding to the image slice may be identified. The identification of the target region may be performed by the region identification unit 610. The target region may include a neck, a chest, a waist, or the like, or a combination thereof. In some embodiments, the target region may be identified based on an anatomical position of an organ (e.g., a basis cranii, a lung, a liver) in a plurality of image slices. For example, if a plurality of image slices includes a basis cranii or a portion thereof, the target region corresponding to the plurality of image slices may be determined as including a neck. As another example, in response to determining that a plurality of image slices include a lung or a portion thereof, the target region corresponding to the image slice may be determined as including a chest. The identification of the target region may be performed automatically by, for example, the region identification unit 601, or manually by a user.

In 703, one or more sections in the image slice may be identified based on the target region. The identification of the one or more sections may be performed by classification unit 620. The classification unit 620 may include different classifiers for identifying different target regions (e.g., different types of vertebrae), such as a classifier for identifying cervical vertebrae, a classifier for identifying thoracic vertebrae, a classifier for identifying lumbar vertebrae, etc. The identified one or more sections may be a rectangular section including a vertebral foramen.

In 704, process 700 may determine whether there is another image slice to be processed. In response to determining that there is another image slice to be processed, process 700 may loop back to 701 to acquire a new image slice of the plurality of image slices. For example, the next image slice may be acquired for processing. As another example, a random image slice may be acquired for processing. Process 700 can then perform operations described in connection with steps 702 and 703. For example, process 700 can identify a target region of the patient corresponding to the new image slice. Process 700 can also identify one or more sections in the new image slice based on the identified target region.

In some embodiments, in response to determining there is no other image slice to be processed, process 700 may proceed to 705. In 705, one or more vertebral foramina in the plurality of image slices may be identified. The identification of the one or more vertebral foramina may be performed by the section determination unit 630. In some embodiments, one or more vertebral foramina may by identified based on one or more sections identified in 703. For example, one or more vertebra foramina may be identified in connection with the determination of a target section as described elsewhere in the disclosure. The target section may be determined by performing a weighted average of the plurality of sections. Alternatively, an overlapping section or a collective section of the plurality of sections may be determined as the target section. As a result, one or more vertebral foramina may be identified in a portion of or all of the image slices.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 700 may identify vertebral foramina in the plurality of image slices simultaneously.

Figure 8:
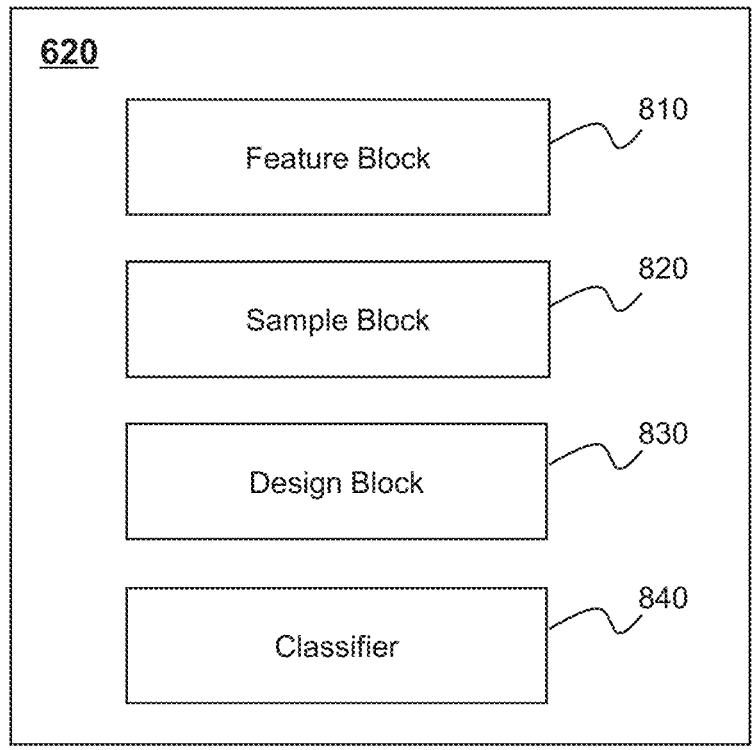
FIG. 8 is a block diagram illustrating an exemplary classifier unit according to some embodiments of the present disclosure.

FIG. 8 is a block diagram illustrating an exemplary classifier unit according to some embodiments of the present disclosure. The classification unit 620 may include a feature block 810, a sample block 820, a design block 830, and a classifier 840. More or less components may be included in the classification unit 620 without loss of generality. For example, two of the modules may be combined into a single module, or one of the modules may be divided into two or more modules. One or more of the modules may reside on a same or different computing devices (e.g., different server computers).

The feature block 810 may generate one or more features for training, validating, and/or testing one or more classifiers (e.g., the classifier 840) and/or perform vertebrae identification using the classifiers. The features may be and/or include, for example, one or more features of a vertebral foramen, a neighboring anatomic structure of a vertebral foramen, or the like, or a combination thereof. The features of a vertebral foramen may include one or more features representative of the texture of the vertebral foramen, a distribution of brightness of the vertebral, a pixel value (e.g., CT value) distribution of the vertebral foramen, or the like, or a combination thereof. The neighboring anatomic structures may include a vertebral body, a vertebral arch, or the like. The features of the vertebral foramen may be obtained by processing image data related to a vertebral foramen (e.g., an image slice, a portion of an image slice, etc. including the vertebral foramen), such as multiplying the image data by a convolution kernel. In some embodiments, the features may include a Harr feature, an average value of pixel values, a representation of edge features, etc.

The sample block 820 may acquire one or more samples related to a region of interest (e.g., a vertebral foramen). In some embodiments, the samples may be acquired based on a plurality of image slices related to the region of interest (e.g., acquired by the acquisition module 410). Each of the samples may include and/or correspond to an image slice, one or more portions of the image slice, etc. The samples may include one or more positive samples and/or negative samples. A positive sample may be a sample that includes desired image data related to the region of interest (e.g., image data including a complete vertebral foramen). Merely by way of example, a complete vertebral foramen may have a complete or substantially complete boundary of a vertebral foramen. As described elsewhere in the disclosure, substantially complete boundary may refer to a boundary having a significant amount of similarity with the complete boundary.

The positive samples may include one or more samples as illustrated in connection with FIGS. 16-B and 16-E below. A negative sample may be a sample that does not include desired image data of the region of interest (e.g., image data including an incomplete vertebral foramen or no vertebral foramen). The negative samples may include one or more examples as illustrated in connection with FIGS. 16-A, 16-C, and 16-D below.

The design block 830 may train one or more classifiers (e.g., the classifier 840) for vertebrae identification. The design block 830 may train the classifiers based on one or more features (e.g., set by the feature block 810) and/or samples (e.g., acquired by the sample block 820). In some embodiments, the design block 830 may train the classifiers using one or more machine learning techniques, such as an Expectation-Maximization (EM) algorithm, an Apriori method, a K-Nearest Neighbor algorithm (KNN), an Adaptive Boosting (Adaboost) algorithm, etc. The classifiers may include, for example, a Support Vector Machine (SVM), a neutral network, a Naïve Bayes classifier, etc.

The classifier 840 may identify a region of interest. In some embodiments, the region of interest may include a vertebral foramen (e.g., as illustrated in FIG. 17-B). The region of interest may be presented in the form of a section in an image slice. The classifier 840 may identify one or more sections in an image slice (e.g., as illustrated in FIG. 17-E).

Figure 9:
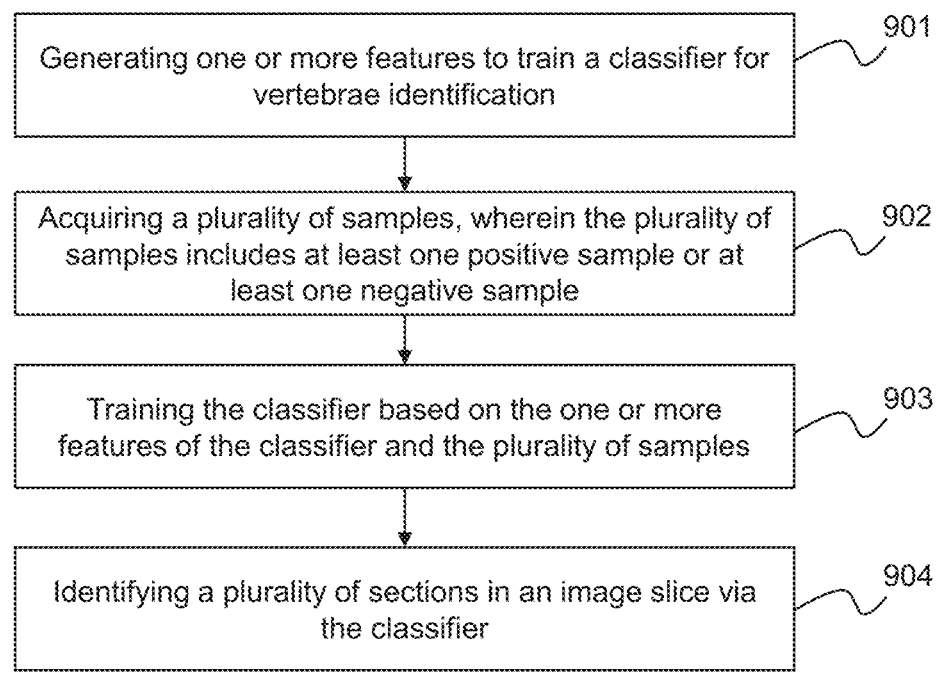
FIG. 9 is a flowchart illustrating an exemplary process for identifying a plurality of sections in an image slice according to some embodiments of the present disclosure.

FIG. 9 is a flowchart illustrating an exemplary process 900 for identifying a plurality of sections in an image slice according to some embodiments of the present disclosure. Process 900 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 900 may be performed in connection with step 703 as described in FIG. 7. Process 900 may be performed by the classification unit 620.

In 901, one or more features may be generated to train a classifier for vertebrae identification. The features may be generated by the feature block 810. In some embodiments, the one or more features may be generated based on one or more features of a vertebral foramen, a neighboring anatomic structure of a vertebral foramen, or the like, or a combination thereof. In some embodiments, the one or more features may include a Hart feature, an average value of pixel values, a representation of edge features, etc.

In 902, a plurality of samples may be acquired. The acquisition of the plurality of samples may be performed by the sample block 820. In some embodiments, the plurality of samples may be acquired from plurality of image slices related to a region of interest. In some embodiments, the plurality of samples may include a plurality of positive samples and a plurality of negative samples.

In 903, the classifier may be trained based on the one or more features of the classifier and the plurality of samples. The training of the classifier may be performed by the design block 830. In some embodiments, the method of training the classifier may include a machine learning method (e.g., EM, KNN, Adaboost, etc.)

In 904, a plurality of sections in an image slice may be identified via the classifier. The identifying of the plurality of sections may be performed by the classifier 840. In some embodiments, each of the plurality of sections may include a rectangular section including a complete vertebral foramen (as illustrated in FIG. 17-B).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 10:
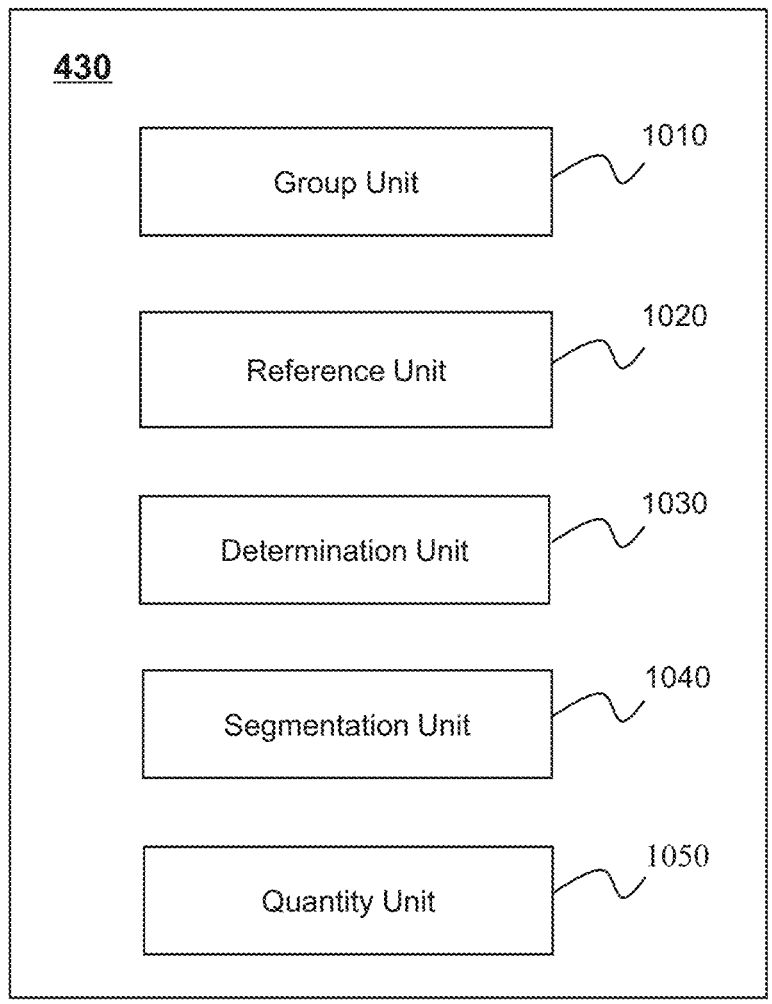
FIG. 10 is a block diagram illustrating an exemplary vertebra detection module according to some embodiments of the present disclosure.

FIG. 10 is a block diagram illustrating an exemplary vertebra detection module 430 according to some embodiments of the present disclosure. The vertebra detection module 430 may include a group unit 1010, a reference unit 1020, a determination unit 1030, a segmentation unit 1040, and a quantity unit 1050. More or less components may be included in the processing engine without loss of generality. For example, two of the modules may be combined into a single module, or one of the modules may be divided into two or more modules. In one implementation, one or more of the modules may reside on a same or different computing devices (e.g., different server computers).

The group unit 1010 may divide a plurality of image slices into one or more groups. Each of the plurality of image slices may include a vertebral foramen with a characteristic boundary. In some embodiments, a group of image slices may include at least one image slice related to a vertebral foramen with a complete boundary. A group of image slices can include any suitable number of image slices, such as one, two, three, or any other positive number of image slices. In some embodiments, the image slices may include one or more image slices corresponding to the vertebral foramina identified by, for example, the classifier 840. In some embodiments, the boundary of a vertebral foramen in the plurality of image slices may appear gradually and disappear gradually (e.g., as illustrated in FIGS. 16-A to 16-D). In some embodiments, a group of image slices may include an identified vertebral foramen (e.g., a vertebral foramen with a complete boundary). The image slices may include successive image slices (e.g., image slices that are associated with successive slice identifiers).

The reference unit 1020 may determine at least one reference point in one or more image slices. The one or more image slices may relate to a plurality of vertebral foramina or vertebrae. In some embodiments, the reference unit 1020 may determine the at least one reference point based on an anatomical position of an organ or tissue in the plurality of image slices. For example, the reference unit 1020 may determine the bottom of the cranii, which is connected to a cervical vertebra in anatomy, as the reference point.

The determination unit 1030 may determine a plurality of vertebrae in a plurality of image slices. In some embodiments, the determination unit 1030 may determine each of the plurality of vertebrae based on one or more groups of image slices divided by the group unit 1010. For example, the determination unit 1030 may update a group of image slices by adding one or more image slices with no vertebral foramen to the group. The updated group of image slices may correspond to the same vertebra. The added one or more image slices may include successive image slices of the image slices in the group.

In some embodiments, the number of image slices may be determined based on a thickness of the corresponding vertebra. For example, if the second cervical vertebra in anatomy is to be determined, the determination unit 1030 may determine a specific thickness (e.g., 50 mm for the second cervical) along the slice direction. The determination unit 1030 may further determine a number of image slices that add up to the specific thickness. For purposes of illustration, in response to determining thickness of a specific vertebra is 50 mm and the slice interval is 0.5 mm, the number of the image slices corresponding to the specific vertebra may be 100. The slice interval may refer to a distance between the centers of two adjacent image slices along the slice direction.

The segmentation unit 1040 may determine a vertebra based on a plurality of image slices by segmenting the image slices. The segmentation may be performed using thresholding techniques, edge detection techniques, region-growing techniques, histogram-based techniques, and/or any other image segmentation techniques. Merely by way of example, the segmentation unit 1040 may segment a vertebra by thresholding the image slices based on a threshold. The threshold may be determined based on a CT value corresponding to a vertebra. More particularly, for example, the threshold may be determined based on a CT value corresponding to a vertebral foramen (e.g., a target section in an image slice). In some embodiments, the CT value corresponding to a vertebra may be in a predetermined range (e.g., a range from 150 HU to 1000 HU or any other suitable range).

The quantity unit 1050 may determine the number of vertebrae determined by the determination unit 1030 and/or the segmentation unit 1040. In some embodiments, the number of vertebrae may be the same as the number of groups of image slices divided by the group unit 1010. In some embodiments, the quantity unit 1050 may determine whether the number of vertebrae determined by the determination unit 1030 is equal to a threshold. The threshold may be a predetermined number of vertebrae in a region of interest.

Figure 11:
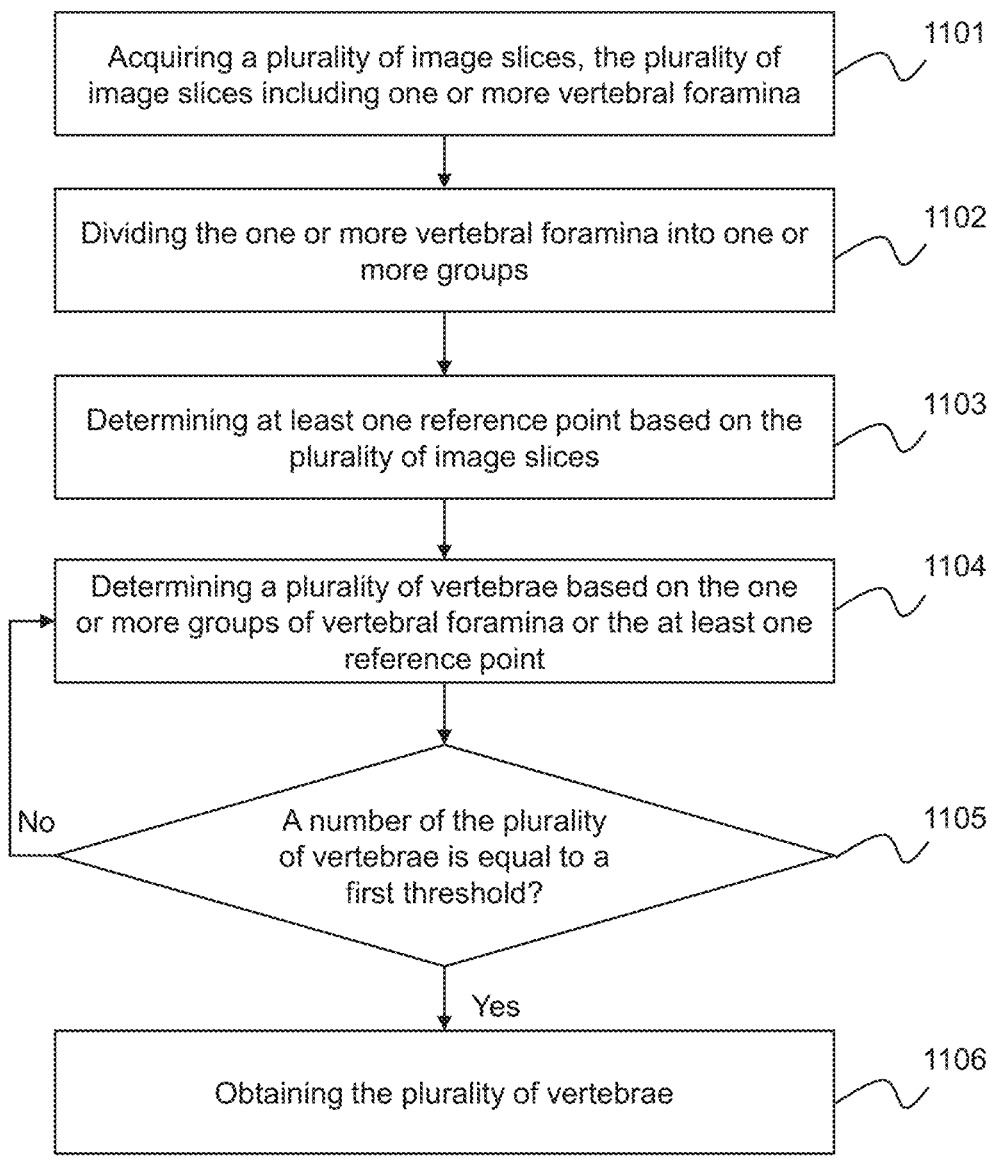
FIG. 11 is a flowchart illustrating an exemplary process for determining a plurality of vertebrae according to some embodiments of the present disclosure.

FIG. 11 is a flowchart illustrating an exemplary process 1100 for determining a plurality of vertebrae according to some embodiments of the present disclosure. Process 1100 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 1100 may be performed in connection with step 503 as described in FIG. 5. Process 1100 may be performed by the vertebra detection module 430.

In 1101, a plurality of image slices may be acquired. The plurality of image slices may include one or more vertebral foramina that are identified by, for example, the classifier 840. The acquisition of the plurality of image slices may be performed by the acquisition module 410.

In 1102, the one or more vertebral foramina may be divided into one or more groups. The division of the one or more vertebral foramina may be performed by the group unit 1010. In some embodiments, each of the one or more groups may include at least one vertebral foramen with a complete boundary. A group of vertebral foramina may be one, two, three, or any suitable positive number of vertebral foramina. In some embodiments, the one or more vertebral foramina may be divided based on the positions of each vertebral foramen. For example, the group unit 1010 may determine vertebral foramina associated with successive slice identifiers (i.e., successive image slices) among the one or more vertebral foramina into the same group. As described elsewhere, the position of an image slice or a vertebral foramen in the image slice may be identified by a slice identifier.

In 1103, at least one reference point may be determined based on the plurality of image slices. The determination of the at least one reference point may be performed by the reference unit 1020. In some embodiments, the at least one reference point may be determined based on an anatomical position of an organ or tissue (e.g., a basis, cranii, a lung, a liver, a heart, a kidney, a stomach, etc.) in the plurality of image slices. Merely by way of example, the bottom of the cranii which is connected to a cervical vertebra in anatomy as the reference point.

In 1104, a plurality of vertebrae may be determined based on the one or more groups of vertebral foramina or the at least one reference point. The determination of the plurality of vertebrae may be performed by the determination unit 1030 and/or the segmentation unit 1040. In some embodiments, vertebral foramina in a same group may correspond to a same vertebra. Further, a specific image slice with no vertebral foramen identified may correspond to the same vertebra when the specific image slice has a successive slice identifier with the vertebral foramina in the same group. Merely by way of example, vertebral foramina may be identified in $1^{st}$ and $2^{nd}$ image slices (i.e., with slice identifiers $1^{st}$, $2^{nd}$), while no vertebral foramen is identified in $3^{rd}$ image slice. Assuming a vertebra may be composed of at least three image slices, the $3^{rd}$ image slice may be determined by the determination unit 1030 that it corresponds to a same vertebra with the $1^{st}$ and $2^{nd}$ image slices. In some embodiments, each of the plurality of vertebrae may be determined by segmenting the plurality of image slices. In some embodiments, the segmentation may be performed by the segmentation unit 1040 as described in connection with FIG. 10.

In 1105, process 1100 may determine whether a number of the plurality of vertebrae is equal to a first threshold. The determination may be performed by the quantity unit 1050. The first threshold may be a theoretical number of the plurality of vertebrae in anatomy. For example, a theoretical number of cervical vertebrae is seven. A theoretical number of thoracic vertebrae is twelve. A theoretical number of lumbar vertebrae is five. As another example, a theoretical number of cervical vertebrae and thoracic vertebrae may be twelve (i.e., a summation of five and seven). In some embodiments, in response to determining that the number of the plurality of vertebrae is not equal to the first threshold, process 1100 may loop back to 1104 and further determine the number of vertebrae for another iteration.

In some embodiments, in response to determining that the number of the plurality of vertebrae is greater than the first threshold, the determination unit 1030 may determine that at least two successive vertebrae of the plurality of vertebrae determined in 1104 belong to a same vertebra in anatomy. Then, the determination unit 1030 may further combine image slices corresponding to the at least two of the plurality of vertebrae and determine a same vertebra. In some embodiments, whether two successive vertebrae belong to a same vertebra may be determined based on a distance between the two successive vertebrae. For the purposes of illustration, the two successive vertebrae may include an anterior vertebra and a posterior vertebra in anatomy along the slice direction. In response to the determination that the distance between the two successive vertebrae is less than a second threshold, the determination unit 1030 may determine that the two successive vertebrae belong to a same vertebra. The distance between the two successive vertebrae may refer to the distance between the centers of the last image slice of the anterior vertebra and the last image slice of the posterior vertebra along the slice direction. The second threshold may be determined based on a theoretical distance.

In some embodiments, in response to determining that the number of the plurality of vertebrae is less than the first threshold, the determination unit 1030 may further determine one or more vertebrae, such as determining one or more vertebrae in successive image slices other than those having a vertebra. In some embodiments, in response to determining that a number of the successive image slices is greater than a third threshold, the determination unit 1030 may determine one or more vertebrae in the successive image slices. The third threshold may be determined based on a theoretical number of image slices between two successive vertebrae.

In response to determining that the number of the plurality of vertebrae is equal to the first threshold, process 1100 may proceed to 1106 and obtain the plurality of vertebrae. The plurality of vertebrae may be stored in a storage device (e.g., the storage 150) for subsequent usage.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 12:
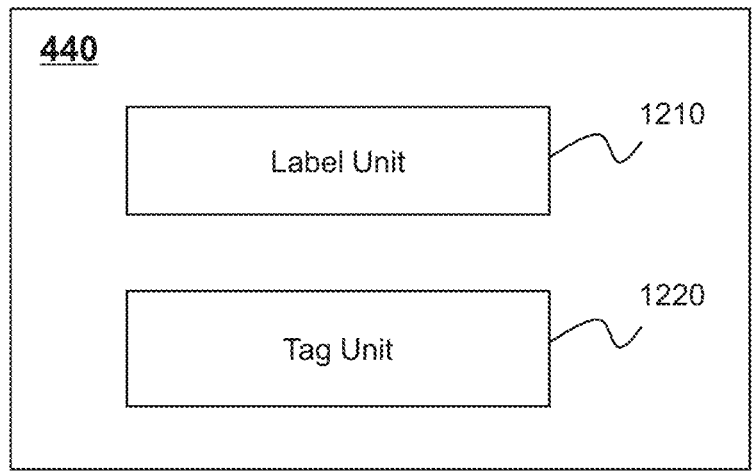
FIG. 12 is a block diagram illustrating an exemplary vertebra tagging module according to some embodiments of the present disclosure.

FIG. 12 is a block diagram illustrating an exemplary vertebra tagging module 440 according to some embodiments of the present disclosure. The vertebra tagging module 440 may include a label unit 1210 and a tag unit 1220. More or less components may be included in the processing engine without loss of generality. For example, two of the modules may be combined into a single module, or one of the modules may be divided into two or more modules. In one implementation, one or more of the modules may reside on a same or different computing devices (e.g., different server computers).

The label unit 1210 may label a plurality of vertebrae in a plurality of image slices and/or a sagittal plane image of a vertebra column. In some embodiments, the label 1210 may label each of the vertebrae by associating the vertebra with one or more labels. Each of the marks may include one or more colors (e.g., "red," "yellow," "blue," "purple," etc.), overstriking, etc. In some embodiments, the label unit 1210 may label the plurality of vertebrae by performing one or more operations described in connection with FIG. 18.

The tag unit 1220 may tag a plurality of vertebrae. Each of the plurality of vertebrae may be associated with a tag. The tag associated with a vertebra may include information about an identifier of the vertebra (e.g., a serial number), a type of the vertebrae, and/or any other information related to the vertebra. The tag may have any suitable format and may include one or more numbers, symbols, characters, etc. In some embodiments, the tag unit 1220 may tag the plurality of vertebrae based on at least one reference point. For example, the reference point may be the bottom of the cranii. The tag unit 1120 may tag the vertebra under the cranii as the first cervical vertebra (i.e., $1^{st}$ cervical vertebra or C1). The tagged vertebra may be used as another reference point to tag one or more other vertebrae. The tag unit 1120 may further tag a vertebra next to the first cervical vertebra as the second cervical vertebra (i.e., $2^{nd}$ cervical vertebra or C2).

Figure 13:
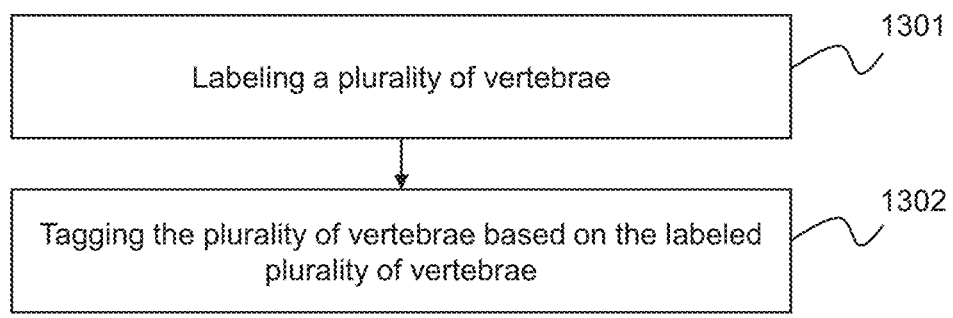
FIG. 13 is a flowchart illustrating an exemplary process for tagging vertebrae according to some embodiments of the present disclosure.

FIG. 13 is a flowchart illustrating an exemplary process 1300 for tagging vertebrae according to some embodiments of the present disclosure. Process 1300 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 1300 may be performed in connection with step 504 as described in FIG. 5. Process 1300 may be performed by the vertebral tagging module 440.

In 1301, a plurality of vertebrae may be labeled. The labeling of the plurality of vertebrae may be performed by the label unit 1210. In some embodiments, the labeling may be performed on a sagittal plane image of the plurality of vertebrae. See, for example, vertical line 1801 in FIG. 18. Before labelling, the location and size of each of the plurality of vertebrae, corresponding to a range of slice identifiers, may be determined by, for example, segmenting the plurality of vertebrae on the sagittal plane image. Each of the vertebrae may be associated with one or more labels. For example, each of the labels may include one or more colors (e.g., "red," "yellow," "blue," "purple," etc.), overstriking, etc.

In 1302, the plurality of vertebrae may be tagged based on the labeled plurality of vertebrae. The tagging of the plurality of vertebrae may be performed by the tag unit 1220. In some embodiments, the tagging of the plurality of vertebrae may be performed orderly when a reference point, such as bottom of the cranii is determined. The plurality of vertebrae may be tagged by information about an identifier of the vertebra (e.g., a serial number), a type of the vertebrae, etc. Merely by way of example, a vertebra may be tagged as the second cervical vertebra (i.e., $2^{nd}$ cervical vertebra or C2).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 14:
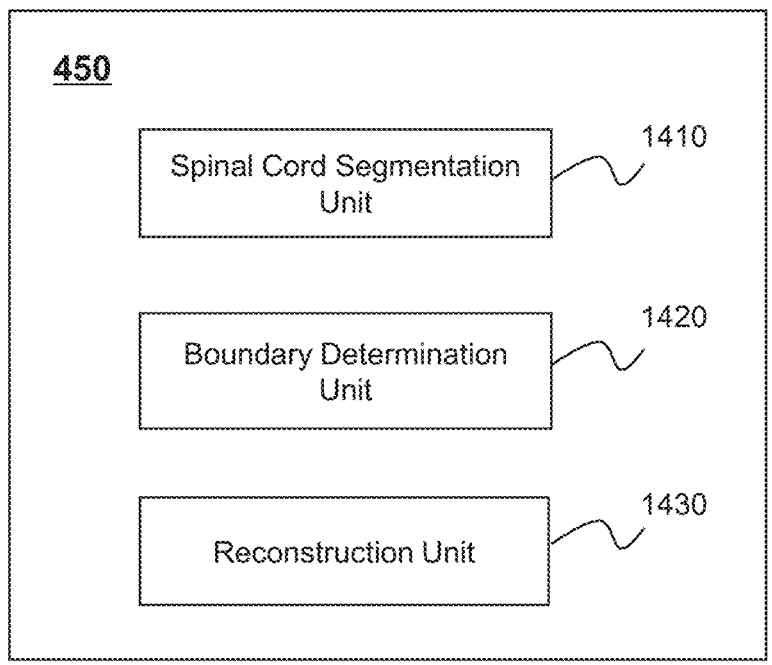
FIG. 14 is a block diagram illustrating an exemplary reconstruction module according to some embodiments of the present disclosure.

FIG. 14 is a block diagram illustrating an exemplary reconstruction module according to some embodiments of the present disclosure. The reconstruction module 450 may include a spinal cord segmentation unit 1410, a boundary determination unit 1420, and a reconstruction unit 1430. More or less components may be included in the processing engine without loss of generality. For example, two of the modules may be combined into a single module, or one of the modules may be divided into two or more modules. In one implementation, one or more of the modules may reside on a same or different computing devices (e.g., different server computers).

The spinal cord segmentation unit 1410 may segment a spinal cord from a plurality of image slices. The spinal cord may reside in the vertebral foramina. In some embodiments, the spinal cord segmentation unit 1410 may segment the spinal cord using threshing, edge detection, region-growing technique, histogram-based technique, etc., before or after the identification of vertebral foramina. Merely by way of example, the spinal cord segmentation unit 1410 may acquire a plurality of samples from a plurality of sections and/or a plurality of target sections in a plurality of image slices, and perform a region growing based on the plurality of samples.

The boundary determination unit 1420 may determine a boundary of the spinal cord. The boundary of the spinal cord may be represented by one or more coordinates (e.g., X coordinates and/or Y coordinates) in the transverse plane. The coordinates may accord to one or more axes in the transverse plane, such as a first axis (e.g., the X axis) and a second axis (e.g., the Y axis). In some embodiments, the X axis may point from the right part towards the left part of a patient, and the Y axis may point from the anterior part towards the posterior part of a patient, as shown in FIG. 18.

In some embodiments, the boundary determination unit 1420 may determine a boundary range of a spinal cord. Then, the boundary determination unit 1420 may determine the boundary of the spinal cord based on the boundary range. For the purposes of illustration, the boundary of a spinal cord may range from a first X coordinate $x_0$ to a second X coordinate $x_1$ along the X axis, and range from a first Y coordinate $y_0$ to a second Y coordinate $y_1$ along the Y axis.

The reconstruction unit 1430 may reconstruct a sagittal plane image of a vertebral column. The sagittal plane image may locate within the boundary of the spinal cord. In some embodiments, the reconstruction unit 1430 may reconstruct the sagittal plane image at a center of the spinal cord (e.g., an average value of $x_0$ and $x_1$).

Figure 15:
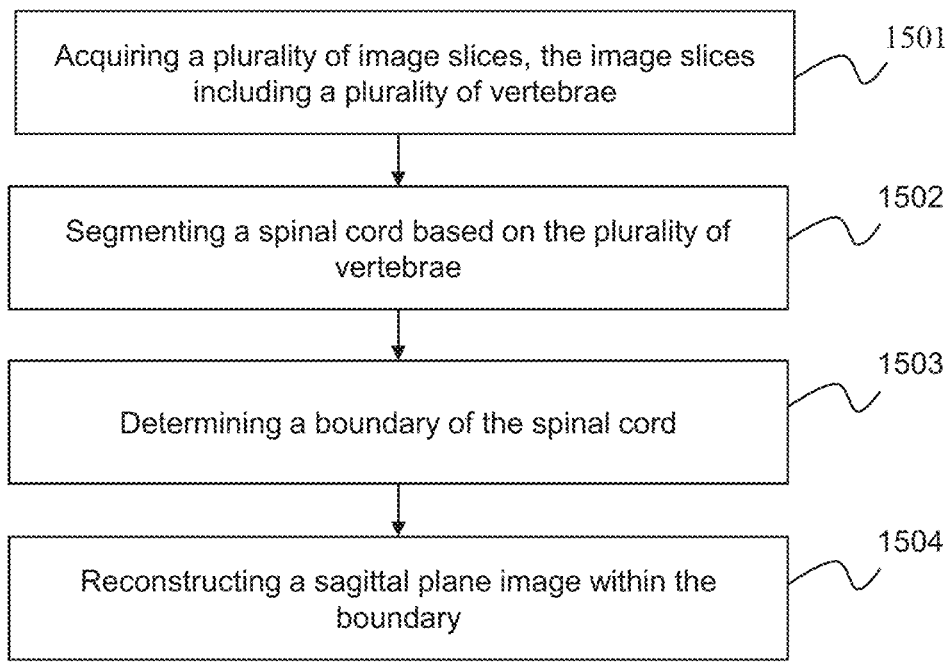
FIG. 15 is a flowchart illustrating an exemplary process for reconstructing a sagittal plane image according to some embodiments of the present disclosure.

FIG. 15 is a flowchart illustrating an exemplary process for reconstructing a sagittal plane image according to some embodiments of the present disclosure. Process 1500 may be performed by processing logic that comprises hardware (e.g., circuitry, dedicated logic, programmable logic, microcode, etc.), software (e.g., instructions run on a processing device to perform hardware simulation), or a combination thereof. In some embodiments, process 1500 may be performed in connection with step 505 as described in FIG. 5. Process 1500 may be performed by the reconstruction module 450.

In 1501, a plurality of image slices may be acquired. The plurality of image slices may include a plurality of vertebrae. The acquisition of the plurality of image slices may be performed by the acquisition module 410. In some embodiments, the plurality of image slices may be the same with the plurality of image slices acquired in 501.

In 1502, a spinal cord may be segmented based on the plurality of vertebrae. The segmentation of the spinal cord may be performed by the spinal cord segmentation unit 1410. Merely by way of example, the spinal cord may be segmented using one or more region growing techniques.

In 1503, a boundary of the spinal cord may be determined. The determination of the boundary may be performed by the boundary determination unit 1420. The boundary of the spinal cord may be represented by X coordinate. In some embodiments, the boundary may be range from a first X coordinate $x_0$ to a second X coordinate $x_1$. In some embodiments, process 1500 may determine an X coordinate corresponding to each pixel of a spinal cord. The process 1500 may further determine the boundary of the spinal cord based on the X coordinate.

In 1504, a sagittal plane image within the boundary may be reconstructed. The reconstruction of the sagittal plane image may be performed by the reconstruction unit 1430. In some embodiments, the sagittal plane image may be reconstructed based on any value of X coordinate within the boundary. In some embodiments, the sagittal plane image may be reconstructed at a center of the spinal cord (e.g., an average value of $x_0$ and $x_1$).

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

FIGS. 16-A to 16-C illustrate exemplary transverse plane images of a cervical vertebra, a thoracic vertebrae and a lumbar vertebrae according to some embodiments of the present disclosure. A transverse plane image is defined by X axis and/or Y axis in the transverse plane. The X axis points from the right part towards the left part of a patient. The Y axis points from the anterior part towards the posterior part of a patient. As shown in FIGS. 16-A to 16-C, a vertebra includes a vertebral foramen, a vertebral body, a vertebral arch, etc. The vertebral foramen may be formed by the vertebral body and the vertebral arch. The spinal cord passes through the vertebral foramen. In FIGS. 16-A and 16-C, the vertebral foramen includes a complete boundary.

FIGS. 17-A to 17-E illustrate exemplary transverse plane images of a vertebral foramen according to some embodiments of the present disclosure. A transverse plane image is defined by X axis and/or Y axis in the transverse plane. The X axis points from the right part towards the left part of a patient. The Y axis points from the anterior part towards the posterior part of a patient. As shown in FIGS. 17-A to 17-D, the transverse plane images are generated along a Z axis (from the feet to the head or from the head to feet with respect to a patient). The boundary of the vertebral foramina 1710, 1730, and 1740 is incomplete. The boundary of the vertebral foramen 1720 is complete. As illustrated in FIGS. 17-A to 17-D, the boundary of the vertebral foramen appears gradually and becomes complete. Then the boundary of the vertebral foramen disappears gradually.

In FIG. 17-E, the vertebral foramen includes a complete boundary. There are three rectangular sections, each including the vertebral foramen.

FIG. 18 illustrates an exemplary sagittal plane image of a vertebral column according to some embodiments of the present disclosure. The vertebral column includes a plurality of vertebrae. Each of the plurality of vertebrae is labeled by a vertical line (e.g., line 1801). The sagittal plane image is defined by Y axis and/or Z axis in the sagittal plane, which is perpendicular to the X axis. The X axis points from the right part towards the left part of a patient. The Y axis points from the anterior part towards the posterior part of a patient. The Z axis points from the inferior part towards the superior part of a patient (i.e., from the feet towards the head).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Pen, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A method implemented on a computing device having at least one processor, at least one computer-readable storage medium, and a communication port, the method comprising:
    acquiring a plurality of image slices related to a vertebral column, the vertebral column including a plurality of vertebrae, the plurality of image slices being generated by an imaging device;
    obtaining a classifier for vertebral foramina identification, wherein the classifier is obtained by training a preliminary classifier using a plurality of samples related to one or more vertebral foramina and one or more features of the preliminary classifier, and the plurality of samples includes at least one of a positive sample or a negative sample;

identifying, by the at least one processor, the one or more vertebral foramina in the plurality of image slices using the classifier;

determining, by the at least one processor, the plurality of vertebrae based on the one or more vertebral foramina;

segmenting image data corresponding to a spinal cord based on the plurality of vertebrae;

determining a boundary of the spinal cord, wherein the boundary ranges from a first coordinate to a second coordinate along an aixs; and reconstructing a sagittal plane image within the boundary.

2. The method of claim 1, wherein the identifying one or more vertebral foramina in the plurality of image slices further comprises:

detecting a plurality of sections in the plurality of image slices; and identifying the one or more vertebral foramina based on the plurality of sections.

3. The method of claim 2, wherein at least one of the plurality of image slices includes more than one of the plurality of sections, each of the more than one of the plurality of sections having a vertebral foramen.

4. The method of claim 3, wherein the determining the plurality of vertebrae further comprises:

determining a weighted average of the more than one of the plurality of sections.

5. The method of claim 1, wherein the determining the plurality of vertebrae further comprises:

dividing the one or more vertebral foramina into one or more groups; and determining the plurality of vertebrae based on the one or more groups.

6. The method of claim 5, wherein the determining the plurality of vertebrae further comprises:

determining at least one reference point based on the plurality of image slices; and determining the plurality of vertebrae based on a distance between the reference point and the identified one or more vertebral foramina.

7. The method of claim 1, further comprising:

reconstructing a sagittal plane image of the vertebral column based on the plurality of vertebrae.

8. The method of claim 7, further comprising:

segmenting the plurality of vertebrae based on the sagittal plane image; and tagging the plurality of vertebrae.

9. A system, comprising:

at least one computer-readable storage medium including a set of instructions;

at least one processor in communication with the at least one computer-readable storage medium, wherein when executing the set of instructions, the at least one processor is directed to:

acquire a plurality of image slices related to a vertebral column, the vertebral column including a plurality of vertebrae, the plurality of image slices being generated by an imaging device;

obtain a classifier for vertebral foramina identification, wherein the classifier is obtained by training a preliminary classifier using a plurality of samples related to one or more vertebral foramina and one or more features of the preliminary classifier, and the plurality of samples includes at least one of a positive sample or a negative sample;

identify one or more vertebral foramina in the plurality of image slices using the classifier; and determine the plurality of vertebrae based on the one or more vertebral foramina;

segmenting image data corresponding to a spinal cord based on the plurality of vertebrae;

determining a boundary of the spinal cord, wherein the boundary ranges from a first coordinate to a second coordinate along an aixs; and reconstructing a sagittal plane image within the boundary.

10. The system of claim 9, wherein to identify one or more vertebral foramina in the plurality of image slices, the at least one processor is further directed to:

detect a plurality of sections in the plurality of image slices; and identify the one or more vertebral foramina based on the plurality of sections.

11. The system of claim 10, wherein at least one of the plurality of image slices includes more than one of the plurality of sections, each of the more than one of the plurality of sections having a vertebral foramen.

12. The system of claim 11, wherein to determine the plurality of vertebrae, the at least one processor is further directed to determine a weighted average of the more than one of the plurality of sections.

13. The system of claim 9, wherein to determine the plurality of vertebrae, the at least one processor is further directed to:

divide the one or more vertebral foramina into one or more groups; and determine the plurality of vertebrae based on the one or more groups.

14. The system of claim 9, the at least one processor is further directed to tag the plurality of vertebrae.

15. The system of claim 13, wherein to determine the plurality of vertebrae, the at least one processor is further directed to:

determine at least one reference point based on the plurality of image slices; and determine the plurality of vertebrae based on a distance between the reference point and the identified one or more vertebral foramina.

16. A non-transitory computer readable medium embodying a computer program product, the computer program product comprising instructions configured to cause a computing system to:

acquire a plurality of image slices related to a vertebral column, the vertebral column including a plurality of vertebrae, the plurality of image slices being generated by an imaging device;

obtain a classifier for vertebral foramina identification, wherein the classifier is obtained by training a preliminary classifier using a plurality of samples related to one or more vertebral foramina and one or more features of the preliminary classifier, and the plurality of samples includes at least one of a positive sample or a negative sample;

identify one or more vertebral foramina in the plurality of image slices using the classifier;

determine the plurality of vertebrae based on the one or more vertebral foramina;

segmenting image data corresponding to a spinal cord based on the plurality of vertebrae;

determining a boundary of the spinal cord, wherein the boundary ranges from a first coordinate to a second coordinate along an aixs; and reconstructing a sagittal plane image within the boundary.

* * * * *